Dec. 18, 1923.
H. H. RUEDIGER
HAND CULTIVATING TOOL
Filed April 27, 1923
1,478,298
Fig. 1.
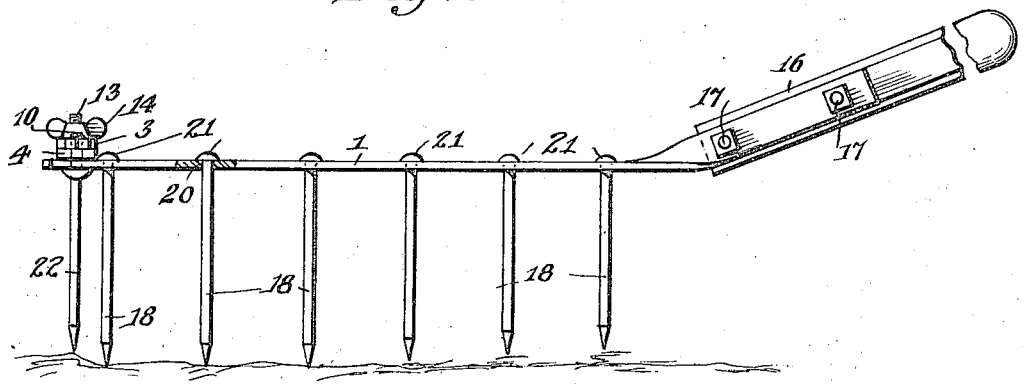
Fig. 3.
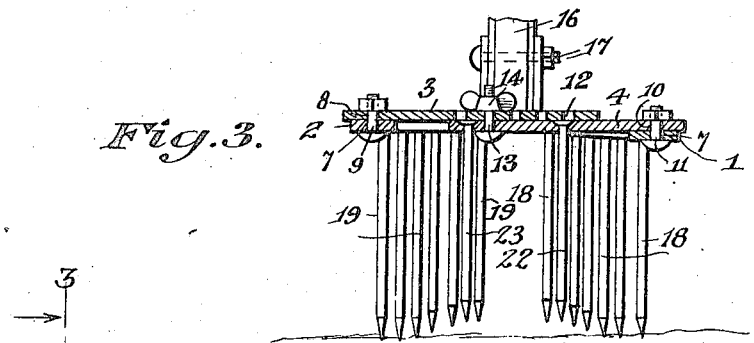
Fig. 2.
INVENTOR.
Henry H. Ruediger,
BY
Geo. P. Kimmel. ATTORNEY.

Patented Dec. 18, 1923.

1,478,298

UNITED STATES PATENT OFFICE.

HENRY H. RUEDIGER, OF HERMANN, MISSOURI.

HAND CULTIVATING TOOL.

Application filed April 27, 1923. Serial No. 635,062.

*To all whom it may concern:*

Be it known that I, HENRY H. RUEDIGER, a citizen of the United States, residing at Hermann, in the county of Gasconade and State of Missouri, have invented certain new and useful Improvements in Hand Cultivating Tools, of which the following is a specification.

This invention relates to hand cultivators for cultivating and pulverizing soil, especially for cultivating vegetables when planted in rows, and has for its object to provide in a manner as hereinafter set forth, a ground working tool, so set up as to enable cultivation to be had by either pulling or pushing the tool without treading upon any of the cultivated ground, as well as further including means for conveniently increasing or decreasing the width of the tool, according to the conditions required for the cultivating of the set of plants.

Although the tool is designed primarily for cultivating purposes, more particularly for the pulverizing of soil, yet it is to be understood that the tool can be employed for any purposes wherein it is found applicable, as for example, for the destruction of weeds in plants.

Further objects of the invention are to provide a hand cultivator which is simple in its construction and arrangement, strong, durable, compact, adjustable, thoroughly efficient and convenient in its use, readily assembled, and comparatively inexpensive to manufacture.

With the foregoing and other objects in view, the invention consists in the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a side elevation, broken away, of a hand cultivator in accordance with this invention.

Fig. 2 is a top plan view, broken away, of a hand cultivator in accordance with this invention.

Fig. 3 is a section on line 3—3 of Fig. 2.

Referring to the drawings in detail, a hand cultivator in accordance with this invention, includes a skeleton body portion, in the form of substantially an equi-lateral triangle and consists of a pair of side bars 1, 2, and an end bar formed of two sections 3, 4.

Each of the side bars 1, 2, at a point between its transverse center and its rear end is tortionally twisted as at 5, to provide a rear end terminal portion 6, which is disposed at an angle with respect to the forward portion of the bar. The tortionally twisted portion 5, as well as the rear end terminal portion 6 of each of the side bars is disposed at an upward inclination. The forward end of each of the side bars 1, 2, is provided with a vertically disposed opening 7.

The section 3 of the end bar, is provided with an opening 8, which registers with the opening 7, and extending through said registering openings, is a hold fast device 9, whereby the bar section 3 is detachably connected with the side bar 1. The bar section 4 at its outer end, is provided with a vertically disposed opening 10, which registers with the opening 7, at the forward end of the bar 2, and extending through said registering openings is a hold fast device 11, whereby the bar section 4 an side bar 2 are detachably connected together.

The bar section 3 is mounted on the bar section 4, that is to say the said section 3 has its inner portion extended upon the inner portion of the bar section 4, and said bar section 3 has its inner portion provided with a series of openings 12, any one of which is adapted to register with an opening 13, formed in proximity to the inner end of the bar section 4. Extending through an opening 12, which registers with the opening 13, is a bolt 14, carrying a thumb nut 15, and said bolt 14 in connection with the nut 15, provides means whereby the bar sections 3, 4, are detachably connected together, and by this arrangement, the width of the body portion of the tool can be increased or decreased when occasion so requires.

The handle of the tool is indicated at 16, and which may be of any desired length, and the forward end of the handle 16, is arranged between the rear end terminal portions of the side bars 1 and 2, and hold fast devices 17 are employed for detachably connecting the handle 16 to the end terminal portions 6 of the side bars 1, 2.

Fixedly secured to the side bar 1 and preferably equally spaced with respect to each other, although the spacing can be as desired, is a series of depending cultivator teeth 18, which gradually increase in height from the rear to the foremost tooth. Fixedly secured at their upper ends to the side bar 2, is a series of spaced cultivator teeth 19 arranged similar to the teeth 18, and which gradually increase in height from the rearmost to the foremost tooth. The teeth 18 and 19 extend down through the side bars 1, 2, as indicated at 20, in Fig. 1, and have their upper ends upset against the side bars 1, 2, as indicated at 21.

Secured to the inner end of the bar section 4, is a depending cultivator tooth 22, and secured to said bar section 4, between the tooth 22 and the outer end of said bar section, is a depending cultivator tooth 23. The teeth 22 and 23 are of less height than the teeth 18 and 19.

The device thus described, provides a tool that can be employed to advantage in various lines of gardening. Where the plants are small and in rows, the gardener has simply to walk backward drawing his cultivator reciprocating it as he walks, and the device works out the weeds and loosens the soil on each side of said rows without injury to leaf or root.

Although the preferred embodiment of a hand cultivator in accordance with this invention, is as described and illustrated, yet it is to be understood that changes in the details of construction can be had which will fall within the light of the invention as claimed.

What I claim is:—

A hand cultivator comprising a skeleton body portion formed of a pair of side bars and an end bar at the forward end of the side bars and formed of a pair of overlapping sections, means for adjustably connecting said sections together to provide for increasing and decreasing the width of said body portion, means for connecting the ends of said sections to the forward ends of said side bars, a handle secured between the rear ends of said side bars, and teeth depending from each of the side bars and from one of the said sections.

In testimony whereof, I affix my signature hereto.

HENRY H. RUEDIGER.